Feb. 9, 1971 O. W. MEMELINK ET AL Re. 27,052

AVALANCHE INJECTION SEMICONDUCTOR DEVICE

Original Filed July 12 1963

INVENTOR.

OSCAR W. MEMELINK

BY

Frank R. Trifari

AGENT

United States Patent Office

Re. 27,052
Reissued Feb. 9, 1971

27,052
AVALANCHE INJECTION SEMICONDUCTOR DEVICE

Oscar Willem Memelink, Emmasingel, Eindhoven, Netherlands, assignor to North American Philips Company, Inc., New York, N.Y., a corporation of Delaware Original No. 3,324,358, dated June 6, 1967, Ser. No. 294,574, July 12, 1963. Application for reissue Sept. 11, 1968, Ser. No. 765,707
Claims priority, application Netherlands, July 19, 1962, 281,182
Int. Cl. H01l 3/00, 5/00
U.S. Cl. 317—235 10 Claims

Matter enclosed in heavy brackets [ ] appears in the original patent but forms no part of this reissue specification; matter printed in italics indicates the additions made by reissue.

ABSTRACT OF THE DISCLOSURE

*An avalanche injection diode or triode comprising a three-layer arrangement in which the middle layer, preferably epitaxially deposited, is very thin and has a low conductance, such that when voltages are applied across the layers, avalanche breakdown occurs producing avalanche injection in the middle layer and a negative resistance in its voltage current characteristic. The three layers may preferably be the same conductivity type, or the first and third layers may be of opposite conductivity types.*

The invention relates to a semi-conductor device, for example a diode comprising a semi-conductor body and at least two electrodes provided thereon, said device being intended to provide a current-voltage characteristic curve with a region of negative differential resistance by avalanche injection between said electrodes. The invention furthermore relates to particularly efficient methods of manufacturing such semi-conductor devices.

The known semi-conductor devices of the kind set forth are described inter alia in an article in "Solid-State Electronics." 1960, vol. I, pages 54–74 and in British patent specifications 849,476 and [848,477] *849,477*. They are based on the effect of the so-called avalanche injection, which may be described as follows. If in a semi-conductor body e.g. an n-type body with two electrodes consisting of a contact with the associated, high-doped, n-conducting zone, the voltage difference between said electrodes is raised, the electric field intensity in the body initially increases uniformly until with a given external voltage, termed hereinafter the avalanche voltage, a given critical field intensity in the body is attained, at which by the avalanche effect, i.e. by a pulsatory ionisation mechanism similar to that of gas discharges, holes and electrons are released in the semi-conductor body. The holes thus liberated and injected into the body owing to the avalanche mechanism (hence the term avalanche injection) travel towards the negative electrode, where they can be conducted away only with difficulty owing to the presence of the high-doped, n-conducting electrode zone, so that by the accumulation thereof in front of said electrode an increase in conductivity near said negative electrode is produced in the body. This results in a further increase in field intensity near the other, positive electrode, so that the avalanche injection in this region further increases and the conductivity near the negative electrode continues to rise. Finally a condition is attained in which the electric field corresponding to the external voltage difference is concentrated substantially completely in a thin layer near the positive electrode, whereas a weak electric field prevails in the remaining part of the body, which is flooded by the injected holes. Therefore, the current-voltage characteristic curve of such a device exhibits, apart from a region of a gradually increasing current intensity with the increasing voltage, after the avalanche point is reached, a region of negative differential resistance in which the current intensity strongly increases owing to the avalanche injection mechanism in spite of a decrease in external voltage.

Although the above explanation is given with reference to an $n^+$-n-$n^+$-structure, it equally applies to a $p^+$-p-$p^+$-structure, when the functions of the holes and electrons and the polarity of the voltage are changed. Instead of using low-doped n- or p-conducting material, use may be made of substantially intrinsic semi-conductor material. It has also been proposed, in the case of intrinsic semi-conductor material to use a $p^+$-i-$n^+$-structure. *In the latter case, as is described in British Pat. No. 849,476, the mode of operation is rather different from that of the $n^+$-n-$n^+$ structure. When the $n^+$ electrode is biased positively with respect to the $p^+$ electrode by a small amount, the situation is just analogous to a p-i-n diode biased in reverse, and the small current which should flow results from the finite leakage velocity of the electrode connections and from the thermal excitation of carriers within the intrinsic mass of semiconductor material. At some larger voltage, the field between the $n^+$ and $p^+$ regions at their point of closest approach will become large enough for avalanche injection to take place, and a negative resistance region should be observed in the characteristic of the diode, followed by a region of constant voltage. It should be noted that with this arrangement two avalanches, one at each junction connection, are necessary to inject both holes and electrons into the intrinsic region.*

In the two-electrode embodiment described above these devices are known under the name of "avalanche injection diodes." By adding a third electrode, for example a $p^+$-electrode to an $n^+$-n-$n^+$-structure, the so-called avalanche injection triode is formed, in which the third electrode may be used to act upon the avalanche voltage between the two other electrodes by the injection of holes or as collector electrode for the injected holes.

Since the critical field intensity at which the avalanche mechanism starts is very high, with germanium for example of the order of $10^5$ v./cm., the obtainment of suitably low values of the avalanche voltage and of the associated current intensity would require such extremely small dimensions of the assembly that the manufacture would be particularly difficult. In known practical embodiments of these devices said difficulties were avoided by arranging one of the electrodes on a large, homogeneous body in the form of an alloy electrode with an extremely small surface of the electrode zone and, as the case may be, of the adjacent part of the body, for example having a diameter of $10\mu$, whereas the other electrode with a much larger surface establishes an ohmic connection with the bottom side of the body. Although by utilizing the strong field concentration near this substantially punctiform electrode zone low values of the avalanche voltage with reasonably low current intensities have been achieved, this embodiment has the disadvantage that the dimensions of the zone associated with the electrode, which dimensions determine to a high extent not only the magnitude of the avalanche voltage but also of the associated current intensity, must be extremely small. Therefore, the requirements for the fairly difficult manufacture of small electrodes are very severe with respect to the desired reproducibility, while the whole construction is delicate. With this construction it is furthermore difficult to render the desired values of the avalanche voltage and of the associated current intensity independent of each other, since both are deterd to a considerable extent by the dimensions of the ode.

e invention has for its object to provide inter alia vel embodiment of such a semi-conductor device, n does not exhibit the said disadvantages or ex- them at least only to a highly reduced extent and n, can, moreover, be manufactured in a simple, repro- le manner. The invention has furthermore for bject to provide particularly suitable methods of ufacturing said embodiment.

accordance with the invention, the semi-conductor of a semi-conductor device of the kind set forth rises between the electrodes with the associated conductor electrode zones at least two layers of the conductivity type and having different conduction s, the layer of the lower conduction being thinner the layer of higher conduction and having a con- on value which is at least a factor 10 lower than of the layer of higher conduction, while one of the odes with the associated semi-conductor electrode is arranged on the layer of lower conduction and a er electrode establishes an ohmic connection to the of higher conduction.

hereas the layer of higher conduction serves mainly as a supporting body or a substratum for the other and to this end establishes an electric connection inimum resistance to the other layer, the thin layer e lower conduction is the effective layer in which valanche injection process is performed, the thick- of said layer (measured between the electrode zone e applied electrode and the layer of higher conduc- being therefore chosen as small as is required with ct to the desired avalanche voltage. In order to nize the voltage drop across the layer of higher con- on with respect to the useful voltage drop across ower-conduction layer the conduction value of the r-conduction layer is preferably a factor 100, pref- y 1000 higher than that of the lower-conduction . The thickness of the higher-conduction layer is n preferably at least equal to 50μ, for example l to 100μ, so that during manufacture it can be easily led as a separate body and can serve effectively as a orting substratum for the thin layer.

ving to the presence of the thin, lower-conduction in the embodiment of the invention it is not neces- or at least the requirement is less severe than with nown device, to utilize the effect of the field concen- n near a punctiform electrode in order to achieve nably low values of the avalanche voltage and of ssociated current intensity. The magnitude of the nche voltage in the embodiment of the invention be determined to a high extent solely by the choice e thickness of the lower-conduction layer, whereas nagnitude of the associated current intensity can be independently thereof to a high extent by the choice e dimensions of the electrode and/or of the associ- electrode zone applied to said layer and by the e of the doping percentage of said layer. In order tain a favourable low value of the avalanche volt- the thickness of the lower-conduction layer beneath lectrode zone is preferably chosen to be smaller 25μ.

e electrode zone on the lower-conduction layer may rmed in any desired shape; generally it has an ap- mately circular or rectangular shape, the dimensions hich i.e. the diameter of the sides in the plane paral- the lower-conduction layer may be chosen to ex- if desired by many times its own value, the thick- of the substratum, whereas nevertheless the ava- e voltage does substantially not vary with said di- ions.

lthough it is possible, within the scope of the inven- to use a substantially intrinsic conducting layer to the lower-conduction layer, in which case the elec- zone of the electrode on the intrinsic layer preferably has a conductivity type opposite that of the higher-conduction layer, the layers both consist preferably of]

*It is possible, within the scope of the invention, to use a substantially intrinsic conducting layer to form the lower-conduction layer, in which case the electrode zone of the electrode on the intrinsic layer preferably has a conductivity type opposite that of the higher conduction layer, as described in British Pat. No. 849,476.*

*Preferably, both layers consist of* n-conducting or p-conducting material, whereas the electrode zone on the layer of the lower n- or p-type conductivity respectively is of the same conductively type and has a higher conduction value, so that the semi-conductor body has a $p^+$-p-$p^+$-structure or an $n^+$-n-$n^+$-structure.

The structure according to the invention is particularly suitable for an avalanche injection diode having two electrodes. However, it is also particularly advantageous for a semi-conductor device in which the said two electrodes have joined to them at least one further electrode. In the device embodying the invention this further electrode may be applied in a simple, advantageous manner at the side of one of the said electrodes to the lower-conduction layer, where it can fulfill the aforesaid, known functions in the immediate proximity of the active part between the two other electrodes.

In accordance with the invention a semi-conductor device of this kind can be manufactured in a simple manner by using out-diffusion, in which case the lower-conduction layer is obtained by diffusing out of the surface layer of a body having a high conduction value, owing to the presence of an impurity capable of diffusing out, said impurity by means of thermal treatment, for example in vacuo. The out-diffusion process is a technique known per se, already used for the manufacture of semi-conductor devices.

In a further preferred embodiment of the method according to the invention the lower-conduction layer is applied to the higher conduction layer by epitaxial agency by growing it from the vapour phase, for example by evaporation of the semi-conductor itself or by dissociation of a volatile semi-conductor. Apart from a great accuracy of the thickness of the epitaxial layer, this method has an additional advantage in that the difference in conduction between the two layers can be chosen very high, one independently of the other, while nevertheless the junction between the two layers can be made very abrupt. A semi-conductor device according to the invention manufactured by said method is therefore characterized in that the lower-conduction layer is applied by epitaxial agency to the layer of higher conduction operating as a support and a current supply.

The invention will now be described more fully with reference to three figures and two embodiments.

Figure 1:
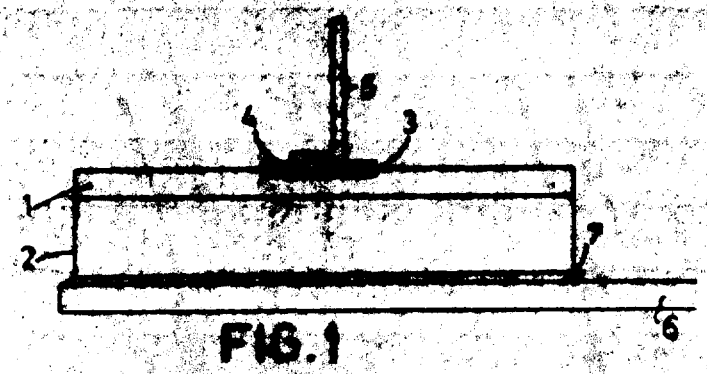
FIG. 1 shows diagrammatically in a cross sectional view a semi-conductor device embodying the invention.

The device shown in FIG. 1, intended for use as an avalanche-injection diode, comprises a p-type conducting germanium body constructed from two layers, one of which 1 has a thickness of about 20μ and has a low conduction value of about 0.1 $ohm^{-1}$ $cm.^{-1}$ and the other layer 2 has a thickness of about 80μ and has a high conduction value of about 200 $ohm^{-1}$ $cm.^{-1}$. To the layer 1 is alloyed an electrode consisting of an aluminum doped, recrystallised, p-type conducting electrode zone 3 and a thin aluminum layer 4, to which a gold supply wire 5 is secured by pressing it against the place concerned of the body by the known pressure-bonding technique, while the whole is heated until the wire alloys to the body. On the bottom side there is provided a copper supporting plate 6, soldered via a gold-gallium alloy 7 to the layer 2, so that an ohmic connection to said layer is established. The electrode zone 3 thus constitutes, together with the layers 1 and 2, a $p^+$-p-$p^+$-structure.

The manufacture starts from a single-crystal germanium pellet of about 80μ in thickness of the p-type conductivity, having a conduction value of about 200 $ohms^{-1}$ $cm.^{-1}$. In known manner an epitaxial p-type layer 1 having a conduction value of about 0.1 $ohm^{-1}$ $cm.^{-1}$ is grown from the vapour phase on said plate until a thickness of about 20μ is reached, for example by precipitating, in vacuo, germanium in the vapour form on the plate or by dissociation of, for example, germanium iodide on the surface of the semi-conductor, while the semi-conductor plate can be heated to a higher temperature in known manner in order to further crystallisation or dissociation.

By using the known alloying technique the layer 1 thus formed can be provided with an aluminum electrode consisting of the aluminum layer 4 and the aluminum-doped, recrystallised zone 3. To this end a circular aluminum spot of a diameter of 80μ and a thickness of about 1μ can be applied by evaporation via a mask, for example, of tantalum foil, after which the assembly is heated at 550° C. for 5 minutes, the recrystallised zone 3 being formed upon cooling. Since the penetration depth of said zone is not more than about 1μ, the thickness of the layer 1 in the present case at the side of the electrode is substantially equal to that between the electrodes 3, 4 and 7. It should be noted in this connection that in this application the thickness of the layer of lower conduction between the electrodes is to be understood to denote the thickness between the electrode zone 3 and the higher-conduction layer. The plate 6 can be soldered to the bottom side of the body at a temperature of for example 400° C.

Figure 2:
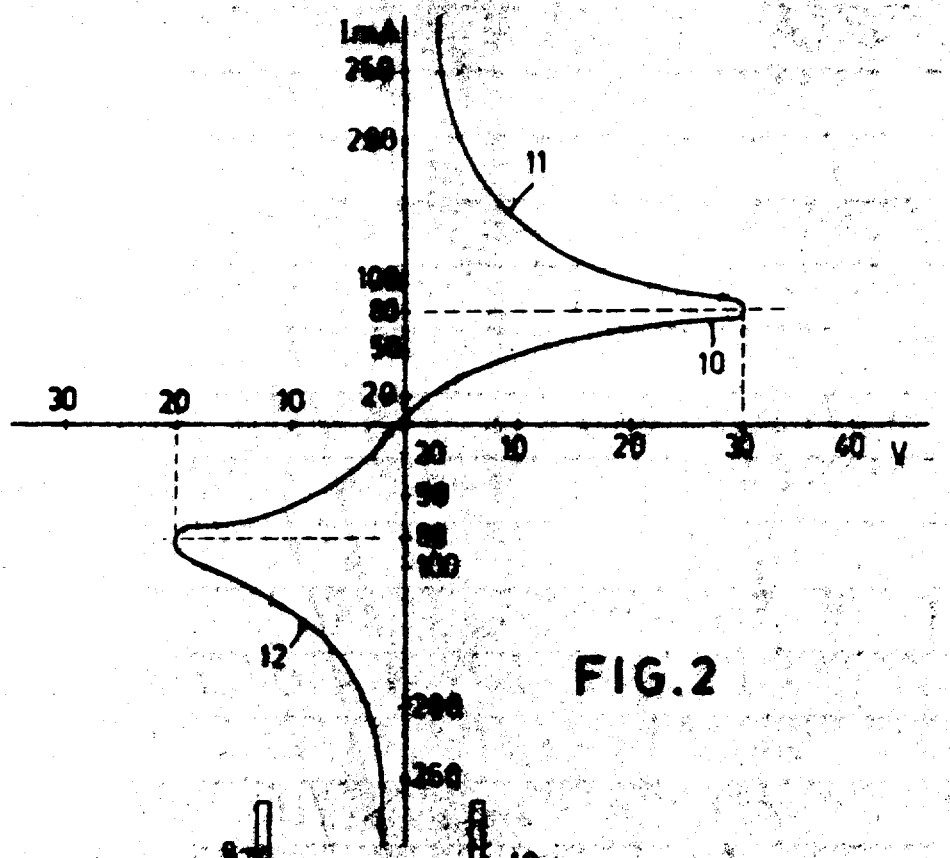
FIG. 2 is a graph of the current-voltage characteristic curve of the device shown in FIG. 1.

FIG. 2 shows the current-voltage characteristic curve of the embodiment described above of the avalanche injection diode of FIG. 1. The contact diameter of the electrode zone 3 and of the aluminum layer 4 was about 80μ, which corresponds to a surface of about $0.5 \times 10^{-4}$ $cm.^2$. The curve 10, 11 of the characteristic corresponds to a direction of the voltage applied with the negative terminal to the supply wire 5. The avalanche voltage was 30 v. and the associated current intensity was about 80 ma., which will be seen from FIG. 2. After this avalanche voltage is reached, the diode exhibits, owing to avalanche injection, the branch 11 of negative differential resistance.

For comparison a similar avalanche injection diode was manufactured, which only had a larger diameter of the electrode zone 3 and of the contact 4, i.e. of about 130μ which corresponds to a contact surface of about $1.5 \times 10^{-4}$ $cm.^2$, the measurement yielding an analogous characteristic with substantially the same avalanche voltage of 30 v., but with a higher value of the current intensity, which was about 140 ma. with this avalanche voltage.

The curve 10, 11 of FIG. 2 was measured on the diode of FIG. 1 with a negative voltage across the supply wire 5 relative to the plate 6. A further advantage of the semiconductor device according to the invention consists in that it provides an appreciably improved symmetry of the current-voltage characteristic curves for the two senses of the voltage as compared with the known devices. With the known devices in which essentially the field concentration near an electrode of small surface is utilized, said field concentration does not occur in the other voltage direction, so that in one direction the avalanche voltage is not reached or is attained only at a much higher value of the voltage. With the structure according to my invention, however, this field concentration is not utilized or is used to a much smaller extent and the avalanche voltage is determined to a greater extent by the thickness of the lower-conduction layer, so that in the two directions of the voltage an analogous characteristic curve with substantially equal or slightly different values of the avalanche voltage can be obtained. It will appear from the curve 12 of FIG. 2 that with a positive voltage at the supply wire 5 an avalanche voltage of about 20 v. was measured with substantially equal values of the associated current intensities. It appears therefrom that the device according to the invention offers the possibility of obtaining a diode which may be employed in two voltage directions, with values of the avalanche voltages which may, if desired, be substantially equal or differ from each other.

Figure 3:
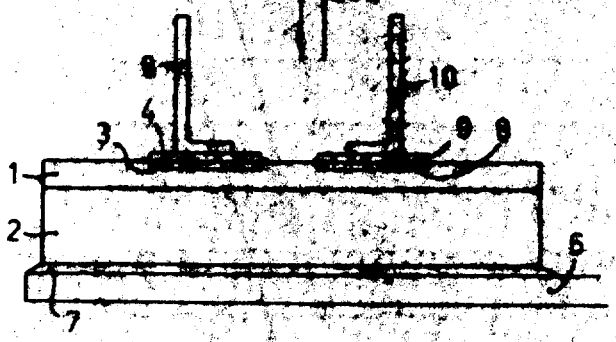
FIG. 3 shows diagrammatically in cross section an avalanche triode according to the invention.

FIGURE 3 shows diagrammatically an example of an avalanche triode according to the invention, which only differs from the diode according to FIGURE 1, in that a further $n^+$ electrodes 8, 9 is applied [a] *at a* short distance from the $p^+$ electrodes 3, 4, for instance at a distance of 20 microns. This further electrode consists of the $n^+$ recrystallised layer 8 and the metal part 9, and may be produced by subsequent evaporation and alloying of a gold-antimony alloy containing for instance 2% antimony. On the metal part 9 a supply wire 10 is provided in the same way as on electrodes 3, 4.

By applying a negative voltage to the wire 10 as compared with supply wire 6 the avalanche-voltage 30 of FIGURE 2 can be influenced and varied depending on the value of the voltage difference between 10 and 6. It is also possible to use electrodes 8, 9 as collector electrode, in which case it is biased in the reverse direction by applying a positive voltage. In the latter case it is more favourable to have the electrodes 8, 9 in annular form surrounding electrodes 4, 5.

It should finally be noted that within the scope of the invention different variants are possible to those skilled in the art. Instead of using germanium a different semiconductor, e.g. silicon, may be used, in which case owing to the larger band distance operation at a higher temperature is permitted and lower values of the current intensity with the same avalanche voltage are attainable. The epitaxial growth of a silicon layer on a silicon body may be carried out by the conventional techniques, for example the dissociation of silanes or halogen silanes in the presence of hydrogen. The device shown in FIG. 1 may be changed into an avalanche injection triode by applying an electrode with an electrode zone, e.g., of n-type conductivity, to the layer 1 at the side of the electrodes 3, 4. Although two layers of different conduction values may suffice, a higher-conduction layer may be provided on the lower-conduction layer, at least locally.

What is claimed is:

1. A semiconductor device adapted to operate by avalanche injection comprising a semiconductive body and at least two opposed electrode connections to said body, said body including between the electrodes at least first, second, and third successive juxtaposed zones of the same conductivity type, the second said zone being thinner than the third said zone and having a relatively low conductance at least a factor 10 lower than that of said third zone, one of said electrodes being connected in an ohmic connection to said third zone, the said first zone having a much higher conductance than that of said second zone, the other electrode being connected to the said first zone, and means for applying across the two electrodes a voltage of such a polarity as to bias one of the junctions between the three zones in the forward direction and of such a magnitude as to cause avalanche injection to occur within the second zone at an avalanche voltage primarily determined by the thickness of said second zone, whereby the device exhibits a current-voltage characteristic with a negative resistance region.

2. A semiconductor device as claimed in claim 1 wherein the third zone has a conductance at least a factor 100 higher than that of said second zone and has a thickness in the direction of a line connecting the two electrodes of at least 50 microns, and the second zone has a thickness in the same direction smaller than 25 microns.

3. A semiconductor device as set forth in claim 1 wherein the second zone is an epitaxial layer of high resistivity.

A semiconductor device as set forth in claim 1 :in the first zone has a much smaller surface area the second and third zones.

A semiconductor device as set forth in claim 1 :in the three zones form a $p^+$-p-$p^+$ structure.

A semiconductor device as set forth in claim 1 :in a third electrode is connected to said second zone.

A semiconductor device as set forth in claim 1 :in the three zones form $n^+$-n-$n^+$ structure.

*A semiconductor device adapted to operate by ava- e injection comprising a monocrystalline semicon- ve body and at least two opposed electrode connec- to said body, said body including between the elec- s at least first, second, and third successive juxta- l zones, the first and third zones being of opposite uctivity types, the second zone being of intrinsic or antially intrinsic material of a conductivity type the as that of the first or third zones, the second zone in the form of a thin layer thinner than the third and having a relatively low conductance at least tor ten lower than that of said third zone, one of electrodes being connected in an ohmic connection id third zone, the said first zone having a much r conductance than that of said second zone, the electrode being connected to the said first zone, means for applying across the two electrodes a volt- of such a polarity as to bias one of the junctions be- the three zones in the reverse direction and of a magnitude producing avalanche injection within econd zone at an avalanche voltage primarily de- ined by the thickness of said second zone, whereby*

*the device exhibits a current-voltage characteristic with a negative resistance region.*

*9. A semiconductor device as claimed in claim 8 wherein the third zone has a conductance at least a factor 100 higher than that of said second zone and has a thickness in the direction of a line connecting the two electrodes of at least 50 microns, and the second zone has a thickness in the same direction smaller than 25 microns.*

*10. A semiconductor device as set forth in claim 9 wherein the second zone is an epitaxial layer of high resistivity on the third zone as a substrate.*

References Cited

The following references, cited by the Examiner, are of record in the patented file of this patent or the original patent.

UNITED STATES PATENTS

| | | | |
|---|---|---|---|
| 2,908,871 | 10/1959 | McKay | 331—108 |
| 2,790,037 | 4/1957 | Schockley | 179—171 |
| 2,772,360 | 11/1956 | Schockley | 250—36 |
| 3,165,811 | 1/1965 | Kleimack et al. | 29—25.3 |

FOREIGN PATENTS

| | | | |
|---|---|---|---|
| 849,477 | 9/1960 | Great Britain | 317—235 |
| 849,476 | 9/1960 | Great Britain. | |

JOHN HUCKERT, Pirmary Examiner

B. ESTRIN, Assistant Examiner

U.S. Cl. X.R.

317—234